Dec. 29, 1964                M. P. HOGUE                3,163,369
             ENCAPSULATED MOTOR FOR WASTE DISPOSAL APPARATUS
Filed July 13, 1962                                 3 Sheets-Sheet 1

INVENTOR.
MARCUS P. HOGUE
BY Richard L. Caslin
HIS ATTORNEY

Dec. 29, 1964  M. P. HOGUE  3,163,369
ENCAPSULATED MOTOR FOR WASTE DISPOSAL APPARATUS
Filed July 13, 1962  3 Sheets-Sheet 2
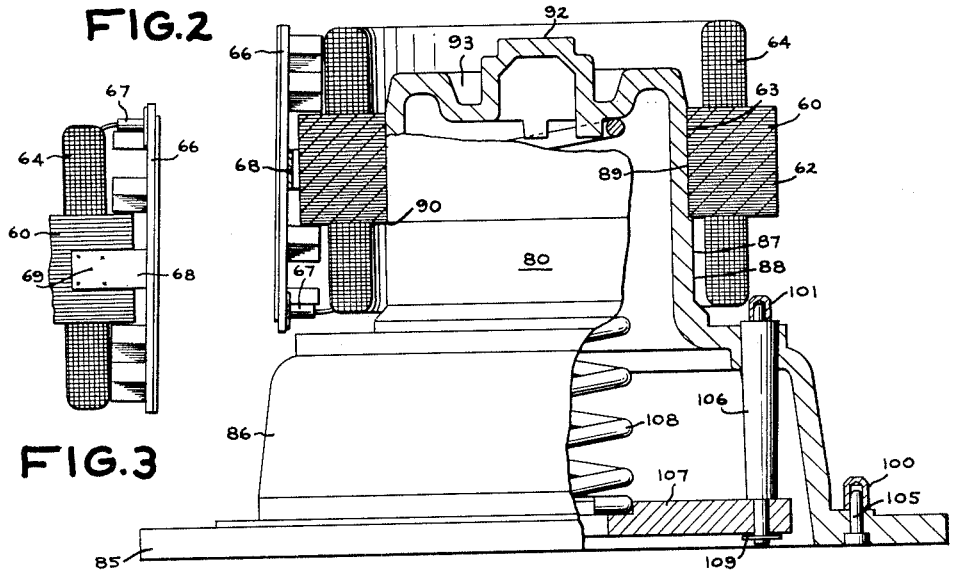
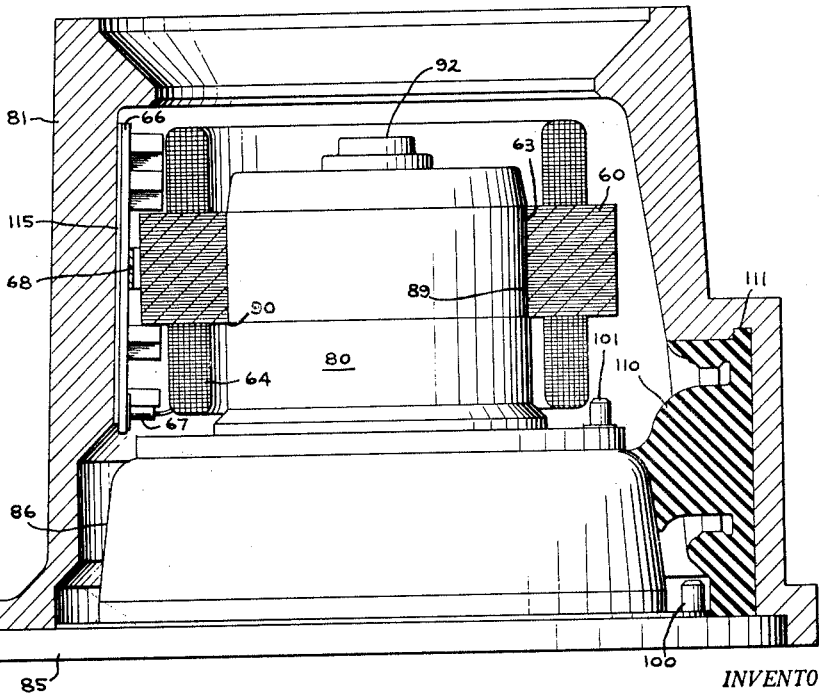
INVENTOR.
MARCUS P. HOGUE
BY Richard L. Caslin
HIS ATTORNEY Dec. 29, 1964    M. P. HOGUE    3,163,369
ENCAPSULATED MOTOR FOR WASTE DISPOSAL APPARATUS
Filed July 13, 1962    3 Sheets-Sheet 3

INVENTOR.
MARCUS P. HOGUE
BY Richard L. Caslin
HIS ATTORNEY

United States Patent Office 3,163,369
Patented Dec. 29, 1964

3,163,369
ENCAPSULATED MOTOR FOR WASTE DISPOSAL APPARATUS
Marcus P. Hogue, Hendersonville, N.C., assignor to General Electric Company, a corporation of New York
Filed July 13, 1962, Ser. No. 209,663
9 Claims. (Cl. 241—46)

This invention relates to electric motors and particularly to a motor having an encapsulated wound stator, where the motor is specially adapted for use with a food waste disposal apparatus.

One of the principal reasons in turning to the encapsulation of the stator is to seal all the intersticies between the stator windings and laminations of the stator iron in order to form an air tight cavity in which the rotor is to turn. Such an air tight cavity is important to the success of a driving bell, shaft-sealing arrangement for the upper bearing of the motor for effectively preventing water from entering the bearing and damaging the unit. Such a motor sealing design for a waste disposal apparatus is taught by the Hardy et al. Patent 2,970,777, which issued on February 7, 1961, and is assigned to the General Electric Company, the same assignee as in the present invention. There is a diving bell seal in the form of an inverted cup-like member positioned over the upper motor bearing. The lower edge of this inverted cup is designed to be immersed in water during the operation of the waste disposal apparatus. The size and shape of the diving bell seal and the air space between the rotor and the stator are so proportioned that the volume of the air space within the inverted cup is substantially greater than the volume of the enclosed air space within the motor. Thus the liquid level in the sump of the disposer is prevented by the build-up of air pressure in the motor from rising high enough to enter the clearance between the shaft of the rotor and the upper motor bearing.

During the encapsulating of the stator in order to form an air tight cavity within the motor, it was discovered that it was possible to form the motor housing simultaneously and a decision was made to capitalize on this possibility in order to take advantage of the freedom of design allowed by the use of a synthetic plastic molding material. A preferred formulation of molding compound utilizes the basic epoxy resin bisphenol A and a mixture of aromatic amines (m-phenylenediamine and methylene dianiline). The use of this material not only gives a previously unattainable chemical resistance, serves as the motor housing, as the bearing support and as the mechanical and chemical protective shield for the stator windings but it also serves well as a heat sink for the heat generated by the motor windings.

The principal object of the present invention is to provide an encapsulated motor with an intergral bearing support that will provide improved concentricity between the outer diameter of the rotor and the inner diameter of the stator, as well as concentricity between fixed and revolving parts of the grinding mechanism.

A further object of the present invention is to provide an encapsulated motor with a terminal board assembly that is molded into an outer wall of the motor housing for ease in wiring the motor to a power circuit as well as for attaching control components to the motor.

A further object of the present invention is to provide an encapsulated motor where the stator is grounded through a terminal board to the ground in the home for additional safety for the user.

A further object of the present invention is to provide a food waste disposal apparatus with an encapsulated motor where the motor is protected from water leakage from the disposer; and the live stator parts are buried in a secondary insulation system.

A further object of the present invention is to provide an encapsulated motor where the inside of the rotor cavity is completely filled with the molding compound as a secondary protection in the event the sealing system might leak.

A still further object of the present invention is to provide a novel method of molding an encapsulated stator of an induction motor so as to have a plug-in terminal board fastened in the outer surface of the motor housing, where the concentricity between the outside diameter of the rotor and the inside diameter of the stator has been improved to within very close tolerances although using mass production methods of molding and assembling the unit.

Briefly stated, in accordance with one aspect of this invention, I provide a design of an encapsulated motor where the stator is molded in a synthetic resin such as an epoxy formulation that is heavily loaded with fillers. During the molding operation the stator is placed on a center plug assembly and an outer mold part is lowered over the combined stator and center plug to form a mold cavity. This cavity is filled with the epoxy resin in liquid form and the resin is cured to form the completed casting. The casting is a hollow bucket-shaped member having a bottom wall with a lower motor bearing support formed therein, cylindrical side walls which have the stator cast therein, and upward side wall extensions to form a sump when the motor is to be used with a food waste disposer. The important advantage in casting the support for the lower motor bearing in the motor housing is to insure accurate concentricity of the outer diameter of the rotor and the inner diameter of the stator so as to achieve a motor with a more uniform air gap. Hence, the magnetomotive force drop across the air gap is constant from pole to pole of the motor. Another improvement which has evolved from this invention is the use of a terminal board assembly that is molded into one outer wall of the motor housing to simplify the molding operation, to facilitate the wiring of the motor to a power circuit, to attach control components to the motor such as a motor starting relay and a motor overload protector, and to provide an electrical ground for additional safety for the user.

My invention will be better understood from the following description taken in conjunction with the accompanying drawings and its scope will be pointed out in the appended claims.

FIGURE 2 is a cross-sectional elevational view of a wound stator positioned upside down on a center plug of a mold assembly in a preliminary step to the encapsulation of the stator in a synthetic resin to form the motor housing, with parts of the center plug assembly being broken away to show the means for stripping the completed casting from the center plug;

FIGURE 3 is a fragmentary view of one side of the wound stator showing the method of attaching a grounding strap of a terminal board to the stator as well as for connecting the leads of the stator winding to the terminal board;

FIGURE 4 is a cross-sectional elevational view similar to that of FIGURE 2 showing the outer mold positioned over the combined stator and center plug to form a mold cavity;

Figure 1:
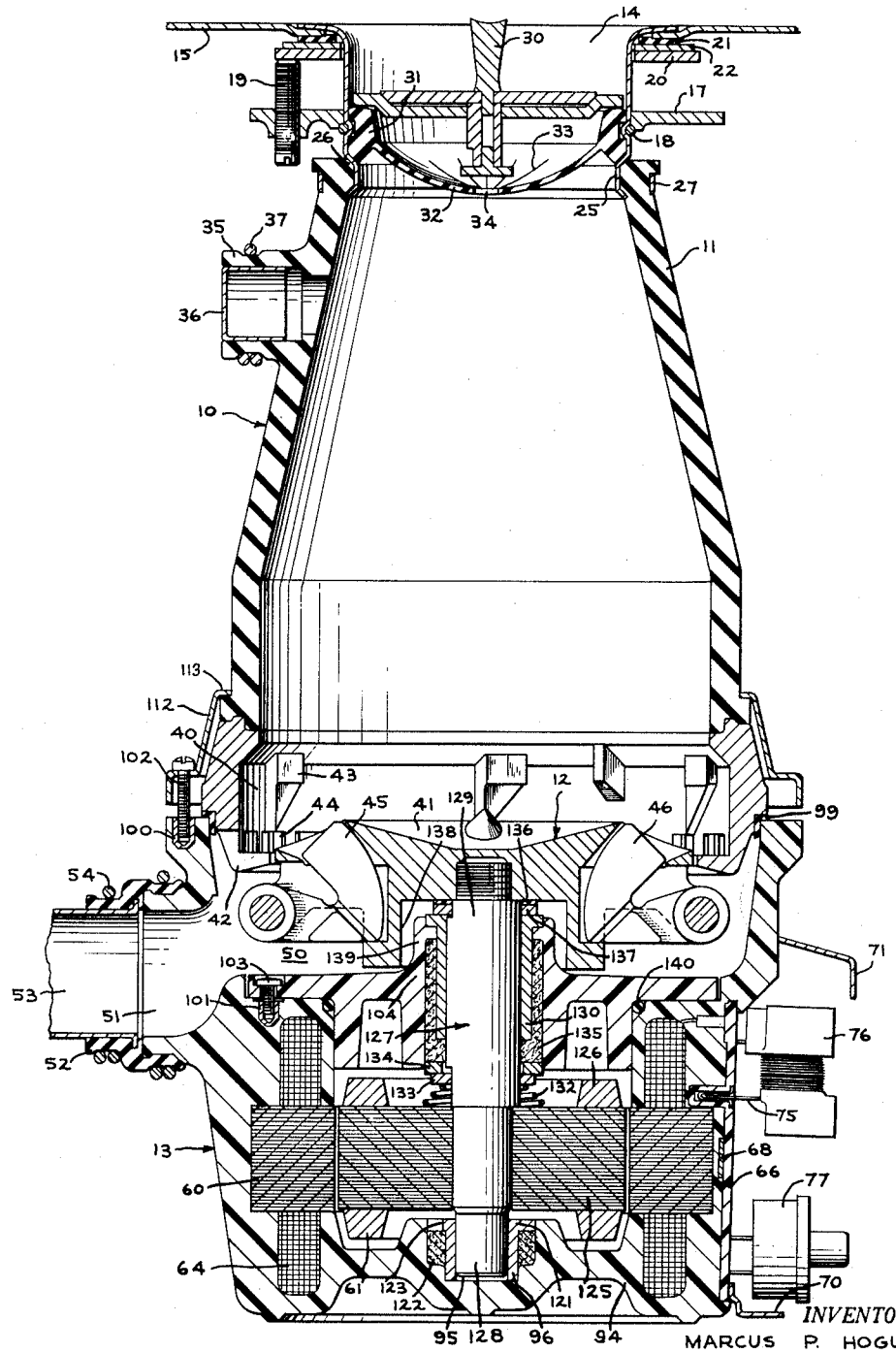
FIGURE 1 is a cross-sectional elevational view of a food waste disposer embodying the present invention.

Turning to a consideration of the drawings and in particular to FIGURE 1, there is shown a detailed illustration of one embodiment of the present invention applied to a food waste disposer 10 which comprises three main elements; namely a cylindro-conical hopper 11, a rotatable comminuting means 12 located adjacent the bottom of the hopper, and a motor assembly 13 in which the present invention is incorporated. The hopper 11 is a tubular member of molded elastomeric material of relatively heavy thickness. The hopper is formed in the shape of a truncated cone, that is, it is tapered slightly inwardly from bottom to top so that the opening at its bottom end is somewhat larger than the top opening. The general nature of this rubber-like hopper 11 is discussed in the Brezosky et al. Patent 2,743,875, which issued on May 1, 1956, and is assigned to the General Electric Company, assignee of the present invention.

The particular comminuting means 12 does not form a necessary part of the present invention but for purposes of illustration the comminuting means is made according to the teachings in the Jenkins Patent 3,005,595, which issued on October 24, 1961, and is assigned to the General Electric Company assignee of the present invention. Moreover, there is a diving bell shaft sealing arrangement for the motor 13. This sealing arrangement is an improvement over that taught by the Hardy et al. Patent 2,970,777, which issued on February 7, 1961, and is assigned to the General Electric Company, assignee of the present invention. More details on the shaft seal will be given hereinafter.

The upper end of the hopper 11 is designed to be suspended from the drain opening or sink flange 14 of a typical kitchen sink 15. Briefly, the suspension means comprises an annular mounting ring 17 which is adapted to be telescoped over the sink flange 14 and supported therefrom by an underlying snap ring 18 or the like. The sink flange 14 is held tightly in the opening of the sink 15 by a plurality of angularly spaced bolts 19 which are threaded up through the mounting ring 17. These bolts 19 may be elevated to bear against a clamping ring 20 which underlies the bottom of the sink 15, but is spaced therefrom by a resilient sealing gasket 21 of rubber and an annular metal ring 22. This clamping action of the bolts 19 between the mounting ring 17 and the clamping ring 20 is performed or completed prior to the assembly of the disposer 10 to the sink flange as will be well understood by those skilled in this art.

Once the sink flange 14 is firmly attached to the kitchen sink 15 it is necessary to join the upper end of the hopper 11 with the lower end of the sink flange 14. This connection is effected by an annular recess rolled in the lower portion of the sink flange and a mating flange 26 in the mouth of the hopper to form a throat with a smaller diameter than the inner diameter of the annular recess 25. The throat may be expanded due to the resilience of the material of the hopper until the flange 26 snaps into the recess 25. Then a tension strap 27 is placed around the mouth of the hopper and tightened by means of a toggle action clamp (not shown) for holding the flange 26 of the hopper firmly attached to the lower end of the sink flange 14.

A sink stopper 30 is adapted to be positioned within the sink flange 14 so that in one position it will seal against a rubber stopper seat 31 of annular shape that is supported on the inward extension of the annular recess 25. Of course the sink stopper 30 may be completely removed from the sink flange 14 so that food waste material may be loaded into the disposer hopper 11. Combined with this stopper seat 31 is a diaphragm 32 that is located within the bore of the annular stopper seat 31 and has a plurality of radial slits 33 emanating from a small central opening 34 so that this diaphragm will serve as a splash guard. This splash guard will not only discourage water from being splashed out of the hopper during the operation of the comminuting means, but it will also serve to restrict the amount of water flow into the hopper so that there is a certain accumulation of water above the diaphragm that will attenuate the noise level during the comminuting operation.

Attention is directed to the small diameter nipple 35 that is formed in the hopper 11 adjacent the upper portion thereof. This nipple is shown as being closed by the removable plug 36 which is held firmly in place by the coiled spring 37 that is wrapped around the exterior of the nipple for clamping down on the plug 36. The purpose of this nipple is to serve as a drain opening for an undercounter dishwasher (not shown) that would have a flexible drain hose that could be connected through this nipple 35 to the disposer 10 thereby saving the expense of making a separate plumbed-in sewer connection for the dishwasher.

Next to be discussed is the comminuting means 12 which is sandwiched between the upper hopper 11 and the lower motor assembly 13. The comminuting means may be considered as consisting of two main elements namely, a stationary shredding means 40 and a flywheel 41. The shredding means is in the form of a shredding ring that is of generally cylindrical shape where the lower portion thereof is provided with a narrow inwardly directed ledge 42. The inner periphery of the ledge 42 establishes a circular opening in which the flywheel 41 is located. The shredding ring 40 includes a series of shredding pads 43 disposed around the inner wall thereof, as well as a plurality of drain openings 44 in the vicinity of the narrow ledge 41 so that water-entrained food waste material may be discharged from the hopper after the waste is comminuted to a fine degree so that it will not clog the sewer lines. Swinging impellers 45 and 46 are pivotally supported from the flywheel adjacent the periphery thereof. When the flywheel is revolved by the motor assembly 13, centrifugal force will tend to swing the impellers outwardly toward the shredding pads 43 as is fully explained in the above-mentioned Jenkins Patent 3,005,595.

Beneath the comminuting means 12 is provided a sump 50 which serves to collect the water and waste material discharging from the hopper through the openings 44. From the sump the accumulation passes out a drain nipple 51 which is connected to a sewer line 53 of the household by the rubber connector 52. The connector is slipped over the nipple and sewer line and is held in place by the coil spring 54 in a manner that is similar to the coil spring 37 of the dishwasher drain nipple 35 mentioned previously.

Turning now to a consideration of the motor assembly 13 and in particular to FIGURE 1 it should be understood that while an induction motor design is shown for purposes of illustration it will be clear to those skilled in this art that this same invention of encapsulating the stator could be used in other motor designs, as it has been done with series motors with equal success. The two main elements of the motor assembly 13 are the wound stator 60 and the rotor 61. The stator 60 is adapted to be encapsulated or potted in a synthetic resin such as an epoxy resin formulation as will be best understood by referring to FIGURE 2. The stator 60 is basically a ring shaped member formed by a thick stack of iron stampings or laminations 62 that have a central center bore 63 and a plurality of shallow radial slots (not shown) emanating from the periphery of the bore. These radial slots form a plurality of poles with the slots therebetween being substantially filled with a plurality of coils of the stator winding 64.

It has been found important to attach the leads from the stator winding 64 to a plug-in terminal board assembly 66 which is shown at the left side of the stator in FIGURE 2. The use of such a terminal board simplifies the encapsulation process, as well as reduces the cost of manufacture, and as will be better understood hereinafter, it adds an important convenience during the servicing of the motor in the field. The terminal board 66 is a sealed printed circuit terminal board assembly which has a series of connection points 67 on its back side so that the leads of the winding 64 may be crimped or otherwise fastened therein. The back side of the terminal board also includes a metal grounding strap 68 which extends beyond each side of the terminal board so that the ends of the strap may be fastened as by spot welding to the stator iron 62 as at 69 in FIGURE 3.

Figure 6:
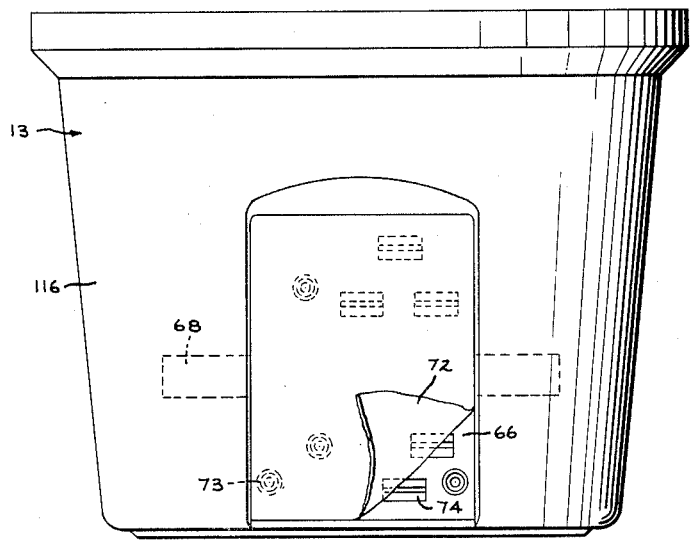
FIGURE 6 is an elevational view of the finished casting positioned right side up, and showing the sheet seal for the outer face of the terminal board assembly partially stripped from the lower righthand corner thereof.

The front face of the terminal board 66 is best shown in FIGURE 6 although it is partially obscured by an adhesive sheet 72 that is pasted over the front face of the terminal board so that the molding compound does not bury the terminal board within the motor housing. As shown in full lines and some in dotted lines the terminal board 66 includes a plurality of threaded insert terminations 73 as well as a plurality of plug-in connectors 74. The threaded insert terminations are for receiving the conductors of power supply cables (not shown) for energizing the motor, while the plug-in connectors 74 are so positioned to receive the attachment blades 75, as seen in FIGURE 1, of control components 76 and 77 such as a starting relay and a motor overload protector respectively. A grounding bracket and cover support member 70 is fastened to the terminal board by means of the threaded insert terminations 73. The metal laminations of the stator are connected through the grounding strap 68 to the insert termination and grounding bracket to an electrical connection cover 71 and through the power supply cable to the ground in the home.

Figure 5:
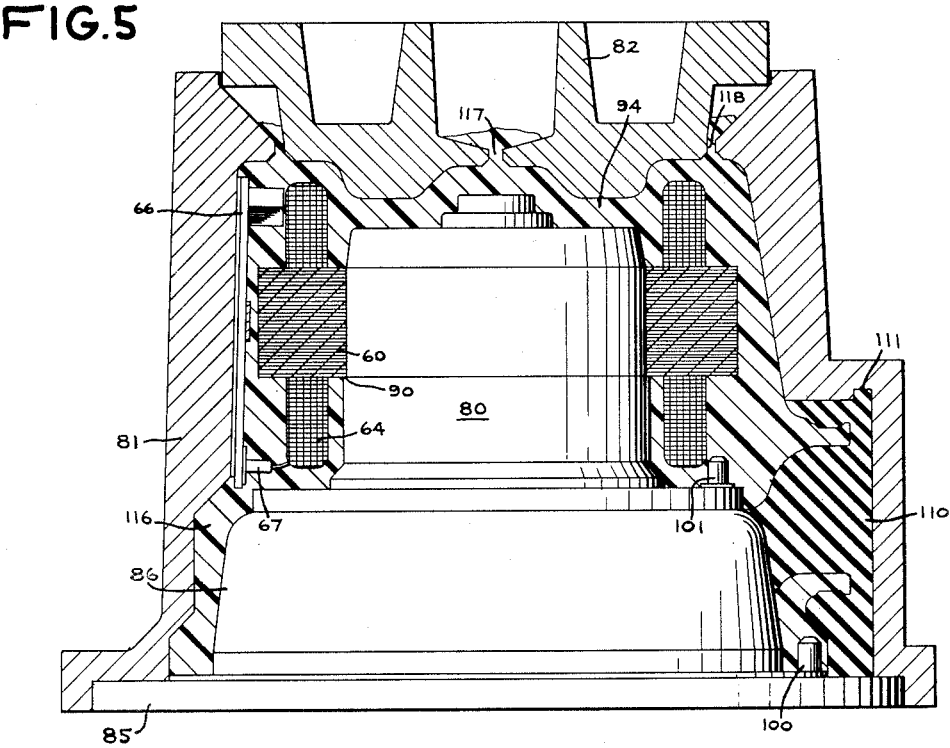
FIGURE 5 is a cross-sectional elevational view similar to that of FIGURE 4 after the resin has been poured into the mold cavity and after a top filler plug has been assembled with the outer mold part in order to define the bottom configuration of the finished product.

Looking at FIGURE 5 of the drawing, the parts of the mold for the motor housing are three in number and represented by a center plug assembly 80, an outer mold 81, and a cap member 82 which fits into the top portion of the outer mold 81 and serves to establish the bottom wall of the motor housing.

Turning back to the preliminary process step shown in FIGURE 2, the center plug assembly 80 is a hollow precision part that has an enlarged base with an outer supporting flange 85, a raised crown 86, and a snug-fitting plug portion 89 which fits into the stator bore 63. Different diameters 88 and 89 are turned on the plug portion 87 so as to establish a narrow shoulder 90 therebetween for supporting the stator on the plug in an upside down position. The shape of this plug portion 87 defines a cavity for receiving the rotor 61. The crown portion 86 of the center plug assembly 80 provides the cavity of the sump 50 of the disposer as best seen in FIGURE 1. The top of the center plug 80 has a raised cylindrical cap 92 which is surrounded at its base by a circular channel 93. This cap and recess formation 92 and 93 respectively impresses on the bottom wall 94 of the motor housing a central bore 95 for a fixed bearing 96.

There are two groups of internally threaded inserts 100 and 101 that are to be embedded in the motor housing as best seen in FIGURE 1. The uppermost group of inserts 100 is located in the top surface of the housing for receiving screw fasteners 102 that serve to hold the motor housing to the disposal hopper 11 by means of a yoke member 112. The yoke is suspended from a narrow ledge 113 adjacent the bottom portion of the hopper. When the screws 102 are tightened they move the motor housing toward the hopper with the shredding ring 40 sandwiched therebetween.

The lower set of threaded inserts 101 are located on a level adjacent the bottom wall of the sump 50 for receiving fastening screws 103 that are used to attach a removable end bell 104 over the rotor bore of the motor housing for forming a completely enclosed motor construction. More information will be given on this removable end bell after the method of molding the motor housing has first been explained.

It is well to mention here the manner in which the threaded inserts 100 and 101 are molded into the motor housing. Looking at FIGURE 2, the series of threaded inserts 100 are positioned over fixed pins 105 that are located in the supporting flange 85 of the center plug assembly. The second series of threaded inserts 101 are positioned on stripper pins 106 which are located in the top surface of the raised crown 86. These stripper pins 106 are of tapered construction converging from the top of the bottom thereof so that the liquid resin will not escape around the pin. This also makes it easy to raise the stripper pins when the finished casting is to be stripped from the center plug assembly 80. These stripper pins 106 are mounted on a common plate 107 which is held down by a heavy coiled spring 108 which bears at one end against the top inside wall of the center plug assembly 80 and is seated at its other end on the plate 107. This spring member 108 tends to bias the stripper pins 106 into the lowered position as seen in FIGURE 2. A suitable clip member 109 is fitted on the lower end of each stripper pin 106 for fastening the pin to the plate 107 so that the pins 106 will move in unison with the plate. This plate member is raised at the opportune time to strip the casting from the mold by mechanism which is not illustrated since it does not form part of the present invention.

Next the outer mold 81 is assembled over the center plug assembly of FIGURE 2 to result in the assemblage of FIGURE 4 and define a mold cavity in which the resin is poured as a liquid and is made to occupy all of the void space between the center plug and the mold. Attention is directed to the drain plug insert 110 which is a rubber plug for forming the drain nipple 51 that leads from the sump 50 of the disposer. This insert which is fitted into the outer mold 81 is a rubber plug which reaches across the space between the inner wall of the outer mold 81 and the center plug assembly 80 and thereby permits the casting of a hole between the sump and the exterior of the disposer. This drain plug insert 110 is provided with narrow shoulders 11 which slip into cooperating recesses in the mold 81 for accurately positioning the insert in the mold. The insert 110 is made of resilient material so that it may be constrained to a rigid shape by the cooperation between the center plug assembly and the structure 81.

Attention is now directed to FIGURE 4 of the drawings where the terminal board 66 is shown tightly pressed against the inclined wall 115 of the outer mold 81. As mentioned previously, there is an adhesive sheet 72 that is placed over the outer face of the terminal board for use during the encapsulation of the stator. This sheet is sandwiched between the terminal board and the wall 115 of the outer mold. This engagement between the adhesive sheet 72 and the wall 115 of the outer mold 81 insures the possibility of the future exposure of this surface after the mold is disassembled. By this is meant that the molding compound does not cover the sheet but instead seals around the periphery of the terminal board assembly while facilitating the ease of withdrawing the finished casting from the mold. Hence the mold design is simplified in that alignment pins for the wiring leads of the stator are not necessary since the wiring leads are held by the terminal board. Accordingly the removal of the casting is accomplished without removing any side actuated circuit element guide pins, fixtures, and the like.

FIGURE 5 of the drawing is similar to that of FIGURE 4 except that the epoxy resin 116 has been poured into the mold cavity completely filling the cavity with some of the resin to spare. The bottom wall 94 of the motor housing is defined by placing a mold plug 82 into the top opening of the outer mold 81. There is a center opening 117 in the top plug 82 as well as a narrow clearance 118 around the periphery of the top plug so that excess material may flow freely from the mold. This method accurately defines the size and shape of the bottom wall 94 of the motor housing, and any overflow represents flashings which can be easily machined off the casting so that the bottom surface of the casting has a finished appearance.

Next the mold is cured for a sufficient length of time at a sufficiently high temperature so that the molding compound will harden and form a rigid structure. Finally, the casting is removed from the mold by first lifting off the outer mold 81 and then raising the knockout pins 106 of FIGURE 2 by raising the plate member 107 on which the pins are supported against the resistance of the coil spring 108. The drain plug insert 110 is then removed from the cured casting.

FIGURE 6 of the drawings shows the finished casting of the motor housing 116 but in its right side up position which is the position which it would be used with a disposer. Next the adhesive sheet 72 is stripped from the front face of the terminal board assembly 66 by using a knife to cut around the edge of the sheet to separate the sheet from the molding compound. Then when the sheet is lifted and pulled from the terminal board it is only the adhesive force of the sheet that resists removal from the board.

Next to be discussed will be the nature and assembly of the motor elements so that attention is now directed to FIGURE 1 of the drawings. First a lower motor bearing 96 of sintered bronze or the like material must be assembled in the bearing bore 95 of the bottom wall 94 of the casting. The bearing 96 is basically a tubular cylindrical member that is larger in outside diameter than the bore 95. The bearing has a top flange 121 which extends outwardly and is press fitted to the side walls of the bore. The clearance under the top flange 121 between the bearing and the bore is filled with a wick member 122 which is adapted to hold a bearing lubricant. This lubricant is added to the wick by forming a small opening 123 in the flange 121 so that the lubricant may be added after the bearing is assembled to the bore.

The wound rotor 61 is represented by a laminated cylinder 125 having a plurality of axial slots (not shown) in the periphery thereof which are substantially filled by bars connecting to the rotor end rings 126. Extending axially through the center of the rotor is a rotor shaft 127 which extends beyond both the bottom and the top ends of the rotor to form a lower journal 128 and an upper journal 129. The lower journal 128 is adapted to be positioned in the bottom bearing 120, while the upper journal 129 is adapted to be positioned in an upper bearing 130 of sintered bronze or the like material that is supported by the removable end bell 104. Before the rotor is assembled in the motor housing, the rotor is combined with the end bell 104 and the flywheel 41. On the upper portion of the rotor shaft 127 is assembled a coiled spring 132 and an upper thrust washer 133. A fixed thrust washer 134 is pressed into the end bell 104. The journal 129 is inserted through the upper motor bearing 130 which bearing is assembled in the end bell 104, and the end bell has a longitudinally splined inner surface for receiving the bearing (not shown). A wick 135 is located in the slots of the spline for providing a supply of lubricant to the bearing and hence to the journal 129. The rotating upper thrust washer 133 pressing against the fixed washer 134 serves to apply a compression force between the two and also between the main thrust washer 137 and the upper flange of bearing 130 as well, so as to seal the lubricant in the bearing and away from the rotor proper.

Next the flywheel 41 of the comminuting system is to be assembled to the shaft 127. There is a rubber washer 136 bonded to a phenolic impregnated fabric washer 137 sandwiched between the underside of the flywheel 41 and the top portion of the upper motor bearing 130 so as to seal the shaft against water penetration. As mentioned previously, there is a diving bell shaft seal provided in this design to prevent water in the sump 50 from leaking into the motor. The diving bell is represented by an inverted cup portion 138 that emanates from the underside of the flywheel. Combined with this inverted cup 138 is an up-turned shoulder 139 on the end bell 104 so that any water entering the shaft clearance of the rotor must rise up to the level of the washers 136 and 137 which is above the bottom edge of the down-turned cup 138 of the flywheel. As mentioned previously the end bell 104 is adapted to be fastened over the rotor bore of the motor by means of fastening screws 103. An O-ring 140 is placed under the end bell to insure that no water will seep under the bell and into the rotor cavity.

The rotor cavity is a water and air tight cavity that is completely filled with the epoxy material as a secondary protection in the event the sealing system might leak after years of normal usage. The volume within the down-turned cup 138 is small in area across the center but is deep or long in path to create a diving bell form. As long as the main thrust washer 137 provides an air tight seal, the diving bell feature is present. Tightness of the main washer 137 against the top surface of the bearing 130 is insured by the spring 132 and lower thrust washer 133. The function of the diving bell principle is not to avoid the use of rubbing surfaces in the seal, but it is intended to position the running surfaces geometrically so that they always run in air instead of in the food waste which is of an abrasive nature.

The next step is to assemble the sub-assembly of the rotor 61, end wall 104, and the flywheel 41 with the motor by locating the lower journal 128 of the rotor in the lower bearing 96 and thereafter tightening the fastening screws 103 to seal the end bell over the motor. Next the shredding ring 40 is assembled into the top bore of the sump housing, in cooperation with a shredding ring gasket 99, and the hopper 11 is assembled over the shredding ring 40. Finally, the yoke 112 is assembled over the hopper and the fastening screws 102 are tightened between the yoke and the threaded inserts 100 on the top edge of the motor housing to finally assemble the unit.

Having described above a novel design of an encapsulated motor and method of making same it will be apparent to those skilled in this art that all the diameters on the center plug assembly 80 are made concentric with each other since they are turned from a single piece of material. For this reason it is possible to limit the eccentricity of any two diameters to less than about .00025 inch. This invention makes it possible to build a precision motor casting of high quality by using motor parts of relatively loose tolerances. One of the principal reasons for constructing the motor in this manner is to obtain better concentricity between the outside diameter of the rotor and the inside diameter of the stator. By maintaining good concentricity between these parts the motor will have a more uniform air gap. The advantages of a constant air gap are the following:

(1) The magnetomotive force drop across the air gap is constant from pole to pole in the motor.

(2) The side bearing loads are a minimum and the noise due to magnetic hum and radial loads is also a minimum.

With conventional motor manufacturing techniques it is necessary to have good concentricity between the inside and outside diameter of the stator punchings. This is necessary because in most conventional motor designs the stator bore is positioned with respect to the bearing bore by gripping the stator on its outside diameter. This method inherently involves the eccentricity between the bearing bore and the alignment diameter of the stator end bells. It also involves the eccentricity between the stator inside diameter and outside diameter. This latter eccentricity is in the order of magnitude of .004 inch and any smaller value becomes expensive to obtain. However the eccentricity between the stator inside diameter and shaft center can be held to .00025 inch.

For example, comparing the present design with conventional designs; in the present design there is expected to be no more than a total shift off-center of the rotor diameter to that of the shaft of .00175 inch where the total air gap is equal to .018 inch for a percent misalignment equal to 9.7 percent. This is calculated by dividing the .00175 by .018. Comparing this with the conventional motor designs the total shift could be as much as .006 inch where the total air gap is still to be .018 inch so that the percent misalignment could equal as much as 33 percent.

One of the main advantages of this invention is the flexibility in design afforded by the material choice and the method of making it. The freedom of design allows the shift of the center of gravity of the total machine more nearly in line with the plane of the comminuting mechanism. Also gained is the rigid constrainment of all of the electromagnetic parts. These previously vibrated at 120 cycles per second but are now not serving as noise emitters. The above features coupled with complete isolation of the machine from all supporting structure by the rubber hopper all contribute to making this machine a truly quiet, heavy duty machine.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. An electric motor comprising a wound stator and a rotor, a terminal board assembly having a grounding strap that is attached to the outside surface of the stator, the stator having winding leads and the grounding strap connected in the terminal board, the stator being encapsulated in a non-conducting resin which harden to form the housing for the motor, the terminal board being located in an outer wall of the housing so that electrical connections may be made to the terminal board.

2. An electric motor comprising a stationary stator and an annular revolving rotor positioned therein, a terminal board assembly attached to the outside surface of the stator, the stator having electrical leads that are connected to the back side of the terminal board, the stator being encapsulated in a non-conducting resin which hardens to form a housing for the motor, the terminal board being located in an outer wall of the housing so that electrical connections may be made to the terminal board, the motor housing including a bottom wall and a cylindrical side wall, there being a fixed bearing located in the center of the bottom wall and concentric with the inside diameter of the stator, the rotor including a central shaft extending therethrough to form an upper and a lower journal, the lower journal being received by the said lower bearing, the upper end of the motor housing being closed by a removable end bell which is adapted to be fastened across the housing, said end bell including a bearing member for receiving the upper journal of the rotor for supporting and guiding the rotor within the motor housing so as to provide the motor with a uniform air gap between the rotor and stator.

3. An encapsulated induction motor comprising a fixed stator and a rotatable rotor so that a rotating magnetic field generated in the stator induces a magnetic field in the rotor and these two fields interact and cause the rotor to turn, the stator comprising an annular stack of laminations which are combined with a plurality of motor windings, the rotor having a type of winding that is located in slots in the rotor, a sealed printed circuit terminal board assembly having a grounding strap that is fastened to the outer surface of the stator, the stator having winding means and its grounding strap connected in the terminal board, the stator also being encapsulated in a non-conducting molding compound which when hardened forms a housing for the motor, the terminal board being located in an outer wall of the housing so that electrical connections may be made to the terminal board, and control components plugged into the terminal board from the exterior of the motor housing, the terminal board being sealed on its outer face during the molding operation, whereby the seal is removable subsequent to the molding operation for proper use of the terminal board.

4. An electric motor comprising a wound stator and a rotor, a terminal board assembly having a grounding strap that is attached to the outside surface of the stator, the stator having winding leads and the grounding strap electrically connected to the terminal board, the stator being encapsulated in a non-conducting resin which hardens to form a bucket-shaped motor housing having a bottom wall and a cylindrical side wall, the terminal board being located within said side wall and supporting a grounding bracket that in turn supports an electrical connection covering for the terminal board so that the stator is grounded through such a system for the safety of the user.

5. In a food waste disposal apparatus, the combination of a vertically extending hopper means having a top access opening for receiving water and waste material, rotatable comminuting means adjacent to the lower end of said hopper means, and power means below and operatively connected to both said hopper means and comminuting means and operable to drive said comminuting means: the invention comprising, a power means in the form of an encapsulated induction motor having an annular stator and a rotatable rotor, a sealed printed circuit terminal board assembly having a grounding strap that is attached to the outer surface of the stator, the stator having winding leads that are terminated in the terminal board, the stator being encapsulated in a molding compound to form a non-magnetic motor housing having the general form of a large bucket with a bottom wall and a cylindrical side wall, the said bottom wall including a fixed bearing adjacent the center thereof for supporting the rotor concentrically with the inner diameter of the stator, the terminal board being sealed to prevent the compound from entering the terminal board during the molding operation, whereby the seal is broken after the molding operation for making electrical connections to the stator, the terminal board including means for receiving control components for the motor, the top portion of the motor housing being closed by a removable end bell where the end bell includes a shaft bearing for supporting and guiding the rotor, the upper portion of the molded motor housing being extended upwardly to form a sump beneath the comminuting means, the lower portion of the hopper being fastened to the upper portion of the motor housing to complete the assembly.

6. A waste disposal apparatus comprising a housing that provides a grinding chamber having at its upper end an inlet opening for water and waste material, comminuting means in the form of a rotating flywheel at the bottom of said chamber, said flywheel including impeller means for acting upon the waste in the chamber, drainage openings through which the comminuted waste passes to a sump beneath the comminuted means; the invention comprising an encapsulated induction motor supported from the comminuting chamber and connected to the flywheel for driving the same, said motor comprising a wound stator and a rotor, the stator being encapsulated in a non-magnetic molding compound which hardens to form a housing for the motor, said housing having a bottom wall, a cylindrical side wall which surround the stator and an upward extension which forms a sump beneath the comminuting means for receiving the water and waste material as it passes from the comminuting means, the bottom wall of the housing having a fixed bearing formed adjacent the center thereof so that the rotor will be concentrically mounted in the housing with respect to the inner diameter of the stator, there being a removable end bell sealed over the motor and having a central bearing therein for supporting and guiding the rotor, said end bell also constituting the bottom wall of the sump for receiving the waste material, the removable end bell being sealed to the motor housing with a water tight seal so that water will not enter the interior of the motor.

7. A waste disposal apparatus as recited in claim 6 wherein a terminal board assembly having a grounding strap is attached to the outside surface of the stator, the stator having leads that are terminated in the terminal board, the terminal board being located in an outer wall of the housing so that electrical power and control connections may be made to the terminal board.

8. In a food waste disposal apparatus, the combination of a vertically extending hopper means having a top access opening for receiving water and waste material therethrough, rotatable comminuting means adjacent the lower end of said hopper means, and power means below and operatively connected to both said hopper means and comminuting means and operable to drive said comminuting means: the invention comprising a power means in the form of an encapsulated electric motor having an annular stator that is fixed and a rotor that is adapted to revolve therein, the stator being encapsulated in a molding compound to form a non-magnetic motor housing having a bucket-shape with a bottom wall and a cylindrical side wall, the said bottom wall including a fixed bearing adjacent the center thereof for supporting the rotor concentrically within the inner diameter of the stator, the open top portion of the motor housing being closed by a removable end bell that includes a central bearing for receiving a shaft portion of the rotor, and a water tight shaft seal cooperating with the said end bell and including a spring biased lower thrust washer between the rotor and a fixed thrust washer on the bottom surface of the end bell, as well as a main thrust washer located on the top surface of the upper bearing beneath the comminuting means so that the spring pressure acting upon the lower thrust washer will tend to create an air tight sealing action between the upper shaft portion of the rotor and the bearing in the removable end bell.

9. In a food waste disposal apparatus as recited in claim 8 wherein the said comminuting means includes a flywheel that has on its under surface a down-turned cup portion which encircles the main thrust washer and has its bottom most edge disposed below the main thrust washer so as to prevent water and waste material from contacting the main thrust washer so that said main thrust washer will operate in free air and provide reliable service.

References Cited by the Examiner
UNITED STATES PATENTS

| | | | |
|---|---|---|---|
| 1,858,870 | 5/32 | Apple | 310—43 |
| 1,881,344 | 10/32 | Apple | 310—43 |
| 2,286,993 | 6/42 | Naul | 310—43 |
| 2,548,133 | 4/51 | Treat | 310—43 |
| 2,782,720 | 2/57 | Dochterman | 310—43 |
| 2,941,258 | 6/60 | Riley | 18—59 |
| 2,951,650 | 9/60 | Gould | 241—286 |
| 2,970,777 | 2/61 | Hardy et al. | 241—46 |
| 3,012,273 | 12/61 | Lewis | 18—4 |

J. SPENCER OVERHOLSER, *Primary Examiner.*

EDWARD J. MICHAEL, *Examiner.*